United States Patent
Garg et al.

(10) Patent No.: US 8,877,673 B2
(45) Date of Patent: Nov. 4, 2014

(54) SUPPORTED CATALYST AND USE THEREOF FOR REFORMING OF STEAM AND HYDROCARBONS

(75) Inventors: Diwakar Garg, Emmaus, PA (US); Frederick Carl Wilhelm, Zionsville, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 13/882,543

(22) PCT Filed: Nov. 8, 2011

(86) PCT No.: PCT/US2011/059714
§ 371 (c)(1),
(2), (4) Date: Apr. 30, 2013

(87) PCT Pub. No.: WO2012/121761
PCT Pub. Date: Sep. 13, 2012

(65) Prior Publication Data
US 2013/0225399 A1  Aug. 29, 2013

Related U.S. Application Data

(60) Provisional application No. 61/412,867, filed on Nov. 12, 2010.

(51) Int. Cl.
*B01J 23/02* (2006.01)
*B01J 37/00* (2006.01)
*B01J 35/10* (2006.01)
*C01B 3/40* (2006.01)
*B01J 23/00* (2006.01)
*B01J 23/78* (2006.01)
*B01J 37/02* (2006.01)
*B01J 23/83* (2006.01)
*B01J 37/08* (2006.01)

(52) U.S. Cl.
CPC ......... *B01J 23/83* (2013.01); *C01B 2203/1247* (2013.01); *B01J 37/0018* (2013.01); *B01J 35/1042* (2013.01); *B01J 37/0009* (2013.01); *C01B 3/40* (2013.01); *C01B 2203/0233* (2013.01); *B01J 23/002* (2013.01); *B01J 23/78* (2013.01); *C01B 2203/1241* (2013.01); *B01J 35/1038* (2013.01); *B01J 37/0201* (2013.01); *C01B 2203/0811* (2013.01); *C01B 2203/1058* (2013.01); *B01J 35/1014* (2013.01); *C01B 2203/1082* (2013.01); *B01J 37/08* (2013.01)
USPC .......................................... 502/183; 423/653

(58) Field of Classification Search
USPC ......................................................... 502/183
See application file for complete search history.

(56) References Cited

U.S. PATENT DOCUMENTS

2004/0142815 A1  7/2004  Ramani et al.
2004/0142817 A1  7/2004  Park et al.
2004/0265225 A1  12/2004  Watson et al.

FOREIGN PATENT DOCUMENTS

| CN | 1156641 A | 8/1997 |
|---|---|---|
| EP | 0130835 A2 | 1/1985 |
| EP | 1808226 A1 | 7/2007 |
| EP | 2092978 A1 | 8/2009 |
| EP | 2165972 A2 | 3/2010 |
| WO | 2010075162 A1 | 7/2010 |

OTHER PUBLICATIONS

European Patent Office, The International Search Report and the Written Opinion of the International Searching Authority, for International Application No. PCT/US2011/059714, mailed Apr. 24, 2012.

*Primary Examiner* — Melvin C Mayes
*Assistant Examiner* — Kenneth Vaden
(74) *Attorney, Agent, or Firm* — Bryan C. Hoke, Jr.

(57) ABSTRACT

A method of making a supported catalyst for reforming of steam and hydrocarbons and a steam-hydrocarbon reforming process using the supported catalyst. The supported catalyst is made from a mixture comprising 20 to 99.5 mass % of lanthanum-stabilized γ-alumina and/or lanthanum-stabilized θ-alumina, 0 to 60 mass % αalumina, 0 to 25 mass % of calcium carbonate and/or magnesium carbonate, and 0.5 to 5 mass % of graphite, a cellulose ether, and/or magnesium stearate. The supported catalyst has a porosity between 55% and 75% and a pore volume between 0.3 cc/g and 0.65 cc/g.

11 Claims, No Drawings

US 8,877,673 B2

SUPPORTED CATALYST AND USE THEREOF FOR REFORMING OF STEAM AND HYDROCARBONS

BACKGROUND

The present disclosure relates to a method of making a supported catalyst and the use of the supported catalyst for reforming of hydrocarbons with steam to produce hydrogen and/or synthesis gas.

Steam-hydrocarbon reforming, also called steam-methane reforming, or SMR, is routinely used by the chemical processing industry to produce hydrogen or synthesis gas. Synthesis gas or syngas is a mixture comprising hydrogen and carbon monoxide. The reforming process is generally carried out at high temperature and pressure to facilitate reaction between steam and methane in the presence of a nickel catalyst supported on alumina, calcium aluminate, magnesium aluminate or any other suitable material. It is a common practice to promote nickel catalyst with potassium to avoid carbon formation in the top portion of the reforming tubes when processing a feedstock containing hydrocarbons having 2 or more carbon atoms. Often times, reformer feed containing minor amounts of C2+ hydrocarbons present in natural gas or heavier hydrocarbon feedstock such as propane, butane and naphtha are pretreated in a prereformer in the presence of nickel catalyst (called prereforming catalyst) to convert the C2+ hydrocarbons to methane prior to steam reforming them to produce hydrogen or synthesis gas.

Nickel-based reforming catalyst typically contains 10 to 25 weight percent nickel in the form of nickel oxide irrespective of potassium promotion. Nickel-based reforming catalysts are supported on refractory alumina, calcium aluminate, magnesium aluminate or any other suitable support material. The porosity of commercially available unpromoted or potassium- or lanthanum-promoted nickel catalyst supported on alumina or calcium aluminate or magnesium aluminate varies from 30 to 40%. The pore volume is less than 0.3 cc/g.

The nickel-based prereforming catalyst contains considerably higher amounts of nickel than reforming catalyst—the nickel content calculated as nickel oxide can vary from 50 to 60 weight %. High nickel content is generally used in prereforming catalysts to provide high activity at low temperatures. The porosity of prereforming catalyst is considerably higher than that of a reforming catalyst—the porosity of a commercially available prereforming catalyst is about 50% compared to 30 to 40% for reforming catalyst. The pore volume of prereforming catalyst is similar to that of reforming catalysts, i.e. less than 0.30 cc/g.

Industry desires steam-hydrocarbon reforming catalysts having high activity for use in prereformers and primary reformers.

Industry desires steam-hydrocarbon reforming catalysts that suppress carbon formation, especially when processing feedstock having C2+ hydrocarbons.

Industry desires steam-hydrocarbon reforming catalysts that do not release corrosive leachates and are compatible with downstream equipment.

BRIEF SUMMARY

The present disclosure relates to a method of making a supported catalyst comprising nickel for reforming of hydrocarbons with steam and a steam-hydrocarbon reforming process using the supported catalyst.

There are several aspects as outlined below.

Aspect #1. A method of making a supported catalyst comprising nickel for reforming of hydrocarbons with steam, the method comprising, in sequence:
  (a) forming a mixture comprising 20 to 99.5 mass % of at least one of lanthanum-stabilized γ-alumina and lanthanum-stabilized θ-alumina, 0 to 60 mass % α-alumina, 0 to 25 mass % of at least one of calcium carbonate and magnesium carbonate, and 0.5 to 5 mass % of at least one of graphite, a cellulose ether, and magnesium stearate;
  (b) forming pellets from the mixture;
  (c) calcining the pellets in one or more heating stages wherein the pellets are heated to at least 975° C. during at least one of the one or more heating stages and wherein the pellets are not heated above 1100° C. during calcining;
  (d) cooling the pellets to between 20° C. and 30° C.;
  (e) soaking the pellets in an aqueous nickel-containing solution comprising at least one of nickel nitrate, nickel hydroxide, and nickel acetate;
  (f) removing the pellets from the nickel-containing solution;
  (g) baking the pellets wherein the pellets are heated to at least 625° C. thereby forming pellets comprising nickel wherein the pellets are not heated above 800° C. during baking; and
  (h) cooling the pellets to between 20° C. and 30° C. to make the supported catalyst comprising nickel.

Aspect #2. The method of aspect #1 wherein the one or more heating stages comprise:
  (i) a first heating step wherein the pellets are heated from a first temperature to at least 575° C. during a first heating time ranging from 1.5 hours to 10.5 hours, wherein the first temperature is within a first temperature range between 5° C. and 50° C., and wherein the pellets are heated to less than 625° C. during the first heating step;
  (ii) maintaining the temperature of the pellets between 575° C. and 625° C. for a first time period of between 5 minutes and 60 minutes;
  (iii) a second heating step wherein the pellets are heated from 625° C. to at least 675° C. during a second heating time ranging from 0.5 hours to 17 hours, wherein the pellets are heated to less than 725° C. during the second heating step;
  (iv) maintaining the temperature of the pellets between 675° C. and 725° C. for a second time period of between 5 minutes and 60 minutes;
  (v) a third heating step wherein the pellets are heated from 725° C. to at least 975° C. during a third heating time ranging from 1 hours to 50 hours, wherein the pellets are heated to less than 1025° C. during the third heating step; and
  (vi) maintaining the temperature of the pellets between 975° C. and 1025° C. for a third time period of between 30 minutes and 180 minutes;
  wherein the step of baking comprises heating the pellets from a second temperature to at least 625° C. during a fourth heating time ranging from 1 hour to 22 hours, wherein the second temperature is within a second temperature range of between 20° C. and 30° C. and wherein the pellets are heated to less than 675° C. during the fourth heating step; and
  wherein the pellets are exposed to an atmosphere comprising oxygen during one or more of the one or more heating steps of calcining.

Aspect #3. The method of aspect #1 or aspect #2 wherein the aqueous nickel-containing solution comprises nickel nitrate solution containing 50 to 250 mg Ni/ml.

Aspect #4. The method of any one of aspects #1 to #3 wherein the atmosphere comprises 15 mole % to 25 mole % oxygen and 75 mole % to 85 mole % nitrogen.

Aspect #5. The method of any one of aspects #1 to #3 wherein the atmosphere is air.

Aspect #6. The method of any one of aspects #1 to #5 wherein the mixture comprises 95 to 99.5 mass % of the at least one of lanthanum-stabilized γ-alumina and lanthanum-stabilized θ-alumina.

Aspect #7. The method of any one of aspects #1 to #5 wherein the mixture comprises 95 to 99.5 mass % of the at least one of lanthanum-stabilized γ-alumina and lanthanum-stabilized θ-alumina, 0 mass % α-alumina, 0 mass % calcium carbonate, and 0 mass % magnesium carbonate.

Aspect #8. The method of any one of aspects #1 to #5 wherein the mixture comprises 20 to 35 mass % of the at least one of lanthanum-stabilized γ-alumina and lanthanum-stabilized θ-alumina, 40 to 60 mass % α-alumina, and 5 to 25 mass % of the at least one of calcium carbonate and magnesium carbonate.

Aspect #9. The method of any one of aspects #1 to #5 wherein the mixture comprises 20 to 35 mass % of the at least one of lanthanum-stabilized γ-alumina and lanthanum-stabilized θ-alumina, 40 to 60 mass % α-alumina, and 5 to 25 mass % calcium carbonate.

Aspect #10. The method of any one of aspects #1 to #5 wherein the mixture comprises 20 to 35 mass % of the at least one of lanthanum-stabilized γ-alumina and lanthanum-stabilized θ-alumina, 40 to 60 mass % α-alumina, and 5 to 25 mass % magnesium carbonate.

Aspect #11. The method of any one of aspects #1 to #10 wherein the mixture comprises less than 0.1 mass % potassium.

Aspect #12. A steam-hydrocarbon reforming process comprising:
introducing a feed gas into a reactor containing the supported catalyst made by the method of any one of aspects #1 to #11, reacting the feed gas in the presence of the supported catalyst under reaction conditions sufficient to react the feed gas and form a reformate in a reforming reaction, and withdrawing the reformate from the reactor,
wherein the feed gas comprises steam and at least one hydrocarbon selected from the group consisting of C1 to C6 hydrocarbons, and
wherein the supported catalyst has a porosity between 55% and 75% and a pore volume between 0.3 cc/g and 0.65 cc/g.

Aspect #13. A steam-hydrocarbon reforming process comprising:
introducing a feed gas into a reactor containing a supported catalyst, reacting the feed gas in the presence of the supported catalyst under reaction conditions sufficient to react the feed gas and form a reformate in a reforming reaction, and withdrawing the reformate from the reactor,
wherein the feed gas comprises steam and at least one hydrocarbon selected from the group consisting of C1 to C6 hydrocarbons,
wherein the supported catalyst comprises a support, 1 to 5 weight % lanthanum (as a promoter), and 10 to 30 weight % nickel as nickel oxide,
wherein the support comprises alumina, calcium aluminate, magnesium aluminate, or mixtures thereof, and
wherein the supported catalyst has a porosity between 55% and 75% and a pore volume between 0.3 cc/g and 0.65 cc/g, and a BET surface area between 20 and 80 m²/g.

Aspect #14. The steam-hydrocarbon reforming process according to aspect #13 wherein the support consists essentially of alumina, calcium aluminate, magnesium aluminate, or mixtures thereof.

Aspect #15. The process according to aspect #13 or aspect #14 wherein the supported catalyst comprises less than 0.01% potassium.

Aspect #16. The process according to any one of aspects #12 to #15 wherein the reaction conditions sufficient to react the feed gas include a temperature ranging from 450° C. to 650° C. and a pressure ranging from 500 kPa to 5000 kPa.

Aspect #17. The process according to any one of aspects #12 to #15 wherein the reaction conditions sufficient to react the feed gas include a temperature ranging from 450° C. to 750° C. and a pressure ranging from 500 kPa to 5000 kPa.

Aspect #18. The process of any one of aspects #12 to #15 wherein the reaction conditions sufficient to react the feed gas include a temperature ranging from 700° C. to 1000° C. and a pressure ranging from 500 kPa to 5000 kPa when the feed gas is essentially free of hydrocarbons other than methane.

Aspect #19. The process according to any one of aspects #12 to #15 wherein the reaction conditions sufficient to react the feed gas include a temperature ranging from 450° C. to 1000° C. and a pressure ranging from 500 kPa to 5000 kPa wherein the feed gas is essentially free of hydrocarbons other than methane when the temperature ranges from 700° C. to 1000° C.

Aspect #20. The process of aspects #18 further comprising:
introducing an oxidant gas mixture containing oxygen and a fuel into a combustion section of a reformer, combusting the fuel and the oxygen to form combustion product gases external to the reactor containing the supported catalyst and generate heat to supply energy for the reforming reaction, and withdrawing the combustion product gases from the combustion section.

DETAILED DESCRIPTION

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used. The adjective "any" means one, some, or all indiscriminately of whatever quantity. The term "and/or" placed between a first entity and a second entity means one of (1) the first entity, (2) the second entity, and (3) the first entity and the second entity.

The phrase "at least a portion" means "a portion or all."

The present disclosure relates to a method of making a supported catalyst for reforming of steam and hydrocarbons. A supported catalyst comprises a support material and catalytic material.

The method comprises forming a mixture comprising 20 to 99.5 mass % of at least one of lanthanum-stabilized γ-alumina and lanthanum-stabilized θ-alumina, 0 to 60 mass % α-alumina, 0 to 25 mass % of at least one of calcium carbonate and magnesium carbonate, and 0.5 to 5 mass % of a lubricant. The γ-alumina and θ-alumina are lanthanum-stabilized, meaning that they are thermally stable and do not undergo phase change when subjected to temperatures as high as 1050 C.

Lanthanum-stabilized γ-alumina and lanthanum-stabilized θ-alumina are available commercially. Lanthanum-stabilized γ-alumina is sold by Engelhard Corporation as HiQ®-7318L and Ga-200L and by Rhodia as MI-386. Lanthanum-stabilized θ-alumina is sold by Rhodia as MI-486. Calcium carbonate, magnesium carbonate and α-alumina are also commercially available from various sources. The lubricant may be at least one of graphite, a cellulose ether, and magnesium stearate. The cellulose ether may be, for example, a METHOCEL™ product sold by the DOW Chemical company.

If desired, the support material may consist essentially of alumina. In this case the mixture may comprise 95 to 99.5 mass % of lanthanum-stabilized γ-alumina and/or lanthanum-stabilized θ-alumina.

If desired, the support material may be a mixture of alumina and calcium aluminate, which is formed during calcination and may be present in varying ratios. The mixture may comprise 20 to 35 mass % of lanthanum-stabilized γ-alumina and/or lanthanum-stabilized θ-alumina, 40 to 60 mass % α-alumina, and 5 to 25 mass % of calcium carbonate.

If desired, the support material may be a mixture of alumina and magnesium aluminate, which is formed during the calcination step and may be present in varying ratios. The mixture may comprise 20 to 35 mass % of lanthanum-stabilized γ-alumina and/or lanthanum-stabilized θ-alumina, 40 to 60 mass % α-alumina, and 5 to 25 mass % of magnesium carbonate.

If desired, the support material may be a mixture of alumina, calcium aluminate, and magnesium aluminate, which is formed during calcination and may be present in varying ratios. The mixture may comprise 20 to 35 mass % of lanthanum-stabilized γ-alumina and/or lanthanum-stabilized θ-alumina, 40 to 60 mass % α-alumina, and 5 to 25 mass % of calcium carbonate and magnesium carbonate.

Use of potassium-promoted reforming catalyst may be problematic due to leaching of potassium with steam during the reforming reaction. The potassium thus leached by steam may cause corrosion in a downstream waste heat boiler. Since the migration of potassium due to leaching with steam may be problematic, the supported catalyst may contain little or no potassium. Accordingly, the mixture may comprise less than 0.1 mass % potassium.

The method comprises forming pellets from the mixture, sometimes called green pellets. The pellets may be formed by extruding the mixture through a die thereby forming extrudate-type pellets. Alternatively, the pellets may be formed by compressing the mixture in molds. Any method of forming pellets known in the art may be used.

The method comprises calcining the pellets in one or more heating stages wherein the pellets are heated to at least 975° C. during at least one of the one or more heating stages and wherein the pellets are not heated above 1100° C. during calcining.

The one or more heating stages comprise a first heating step wherein the pellets are heated from a first temperature, $T_1$, to at least 575° C. during a first heating time, $t_1$, ranging from 1.5 hours to 10.5 hours. The first temperature, $T_1$, is within a first temperature range between 5° C. and 50° C. During the first heating step, the pellets are heated to a temperature which is greater than 575° C. but less than 625° C. A heating time of 0.5 to 10.5 hours corresponds to an average heating rate of about 1° C./minute to about 5° C./minute. The effect of the average heating rate of about 1° C./minute to about 5° C./minute is to slowly burn off lubricant that is added to the feed mixture without disintegrating the pellets.

After the first heating step, the temperature of the pellets is maintained between 575° C. and 625° C. for a first time period of between 5 minutes and 60 minutes. The effect of maintaining the temperature between 575° C. and 625° C. for the first time period is to slowly remove all the lubricant added to the feed mixture during forming of pellets.

Subsequently, the one or more heating stages comprise a second heating step wherein the pellets are heated from 625° C. to at least 675° C. during a second heating time, $t_2$, ranging from 0.5 hours to 17 hours. The pellets are heated to a temperature greater than 675° C. but less than 725° C. during the second heating step. A heating time of 0.5 to 17 hours corresponds to an average heating rate of about 0.1° C./minute to about 0.5° C./minute. The effect of the average heating rate of about 0.1° C./minute to about 0.5° C./minute during the second heating step is to consolidate the structure of the pellets, if there is no calcium or magnesium carbonate added to the feed powder. The effect of the average heating rate of about 0.1° C./minute to about 0.5° C./minute during the second heating step is to decompose a part of calcium and/or magnesium carbonate, react a part of the decomposed calcium and/or magnesium carbonate with alumina to form calcium aluminate and/or magnesium aluminate, and consolidate the structure of the pellets, if calcium and/or magnesium carbonate is added to the feed mixture.

After the second heating step, the temperature of the pellets is maintained between 675° C. and 725° C. for a second time period of between 5 minutes and 60 minutes. The effect of maintaining the temperature between 675° C. and 725° C. for the second time period is further consolidate the structure of the pellets.

Subsequently, the one or more heating stages comprise a third heating step wherein the pellets are heated from 725° C. to at least 975° C. during a third heating time, $t_3$, ranging from 1 hours to 50 hours. The pellets are heated to a temperature greater than 975° C. but less than 1025° C. during the third heating step. A heating time of 1 to 50 hours corresponds to an average heating rate of about 0.1° C./minute to about 5° C./minute.

After the third heating step, the temperature of the pellets is maintained between 975° C. and 1025° C. for a third time period of between 30 minutes and 180 minutes.

Subsequently, the pellets are cooled from 975° C. to between 20° C. and 30° C. in a first cooling step.

The effect of heating the pellets and maintaining the temperature of the pellets in stages, as described above, is to burn off lubricant added to the feed powder, consolidate the structure of the pellets, decompose calcium and magnesium carbonate, react decomposed calcium or magnesium carbonate with alumina to form calcium aluminate or magnesium aluminate, and slowly release carbon dioxide to provide porous structure.

After the first cooling step the pellets are soaked in an aqueous nickel-containing solution, for example nickel nitrate, nickel hydroxide and/or nickel acetate the nickel-containing solution having a concentration of nickel effective to deposit nickel in the pellets to provide pellets comprising nickel. The aqueous nickel-containing solution may be a nickel nitrate solution containing 50 to 250 mg Ni/ml. The nickel-containing solution may be heated to a temperature ranging from 10° C. to 80° C. The pellets are then removed from the nickel-containing solution.

In a baking step, the pellets removed from the nickel-containing solution are heated from a second temperature, $T_2$, to at least 625° C. during a fourth heating time, $t_4$, ranging from 1 hours to 22 hours thereby forming pellets comprising nickel, wherein the second temperature is within a second temperature range of between 20° C. and 30° C. and wherein the pellets are heated to less than 675° C. during the baking step. A heating time of 5 to 22 hours corresponds to an average heating rate of about 0.5° C./minute to 3° C./minute. Slow heating rate prevents catalyst pellets from disintegrating due to rapid evolution of steam.

After the baking step, the pellets comprising nickel are cooled from 625° C. to between 20° C. to 30° C. in a second cooling step to make the supported catalyst comprising nickel.

During the heating steps, the cooling steps, and the steps of maintaining the temperature, the pellets may be exposed to an atmosphere comprising oxygen. The atmosphere may comprise 15 mole % to 25 mole % oxygen and 75 mole % to 85 mole % nitrogen. The atmosphere may be air.

The method of making the supported catalyst has been demonstrated to make a supported catalyst having a porosity of between 55% and 75%, a pore volume between 0.3 cc/g and 0.65 cc/g, and a BET surface area between 20 and 80 $m^2/g$.

The use of lanthanum stabilized γ-alumina and lanthanum-stabilized θ-alumina unexpectedly result in producing nickel catalyst with high porosity and high pore volume with high catalytic activity. The use of lanthanum stabilized γ-alumina and lanthanum-stabilized θ-alumina in combination with calcium-based materials unexpectedly produce nickel catalysts supported on calcium aluminate with high porosity and high pore volume with high catalytic activity.

The supported catalyst may be used in a prereformer and/or a primary reformer. A "prereformer" is a reforming reactor that precedes the primary reformer. A "prereformer" is used to convert hydrocarbon feedstock into synthesis gas by reaction with steam over a catalyst with or without providing heat from an outside source. A prereformer may be an adiabatic fixed bed reactor. A prereformer may be a tubular reactor. Heat to a prereformer may be provided from exhaust gases from a reformer or other source, but is typically characterized by the lack of direct radiation heating by a combustion flame. A prereformer and a reformer may be physically connected.

Prereformers are known in the art. Suitable materials and methods of construction are known. The advantages of using a prereformer include the possibility of reducing the load on the main reformer by converting a part of methane present in the feed stream, coke formation on the main reformer catalyst by converting most of the higher hydrocarbons present in the feed stream, and the ratio of steam to natural gas required for the reforming reaction, Also, the use of pre-reformer provides the luxury of preheating the gaseous feed mixture to a higher temperature prior to introducing it into the main reformer and increasing the life of the catalyst and tubes in the primary reformer.

A prereformer may be distinguished from the primary reformer in that a greater proportion of the conversion of the hydrocarbons fed to the process is realized in the primary reformer than the prereformer.

Accordingly, the present invention also relates to a steam-hydrocarbon reforming process.

In a first embodiment of the steam-hydrocarbon reforming process, the process comprises introducing a feed gas into a reactor containing the supported catalyst made by the method of any one of aspects 1 to 11, reacting the feed gas in the presence of the supported catalyst under reaction conditions sufficient to react the feed gas and form a reformate in a reforming reaction, and withdrawing the reformate from the reactor. The feed gas comprises steam and at least one hydrocarbon selected from the group consisting of C1 to C6 hydrocarbons. The feed gas may optionally comprise 2 to 5 vol. % hydrogen. The steam-to-carbon molar ratio of the feed gas may be between 1.8 and 4.0. The supported catalyst has a porosity between 55% and 75%, a pore volume between 0.3 cc/g and 0.65 cc/g and a BET surface area between 20 and 80 m2/g.

In a second embodiment of the steam-hydrocarbon reforming process, the process comprises introducing a feed gas into a reactor containing a supported catalyst, reacting the feed gas in the presence of the supported catalyst under reaction conditions sufficient to react the feed gas and form a reformate in a reforming reaction, and withdrawing the reformate from the reactor. The feed gas comprises steam and at least one hydrocarbon selected from the group consisting of C1 to C6 hydrocarbons. The feed gas may optionally include 2 to 5 vol. % hydrogen. The steam-to-carbon molar ratio of the feed gas may be between 1.8 and 4.0. The supported catalyst comprises a support, 1 to 5 weight % lanthanum as a promoter, and 10 to 30 weight % nickel as nickel oxide. The support comprises at least one of alumina, calcium aluminate, and magnesium aluminate. The supported catalyst has a porosity between 55% and 75% and a pore volume between 0.3 cc/g and 0.65 cc/g, and a BET surface area between 20 and 80 $m^2/g$.

The steam-to-carbon molar ratio is a conventional term in the field of hydrogen production. The steam-to-carbon molar ratio (S/C ratio) is defined as the (overall) ratio of the moles of steam to moles of carbon atoms in the hydrocarbons in the feed(s) to the reformer. For example if the molar flow rate of steam is 6 moles/s, the molar flow rate of methane is 1 mole/s and the molar flow rate of ethane is 1 mole/s, the steam-to-carbon molar ratio is 2.0. 1 mole/s of methane provides 1 mole of carbon per second and 1 mole/s of ethane provides 2 moles of carbon per second.

Lanthanum is added to the catalyst promoter to suppress the formation of carbon during steam methane or steam-hydrocarbon reforming reaction . . . .

Porosity is calculated as $$\frac{1 - \text{pellet density}}{\text{skeletal density}} \times 100\%,$$

where the pellet density is measured by Hg porosimetry and the skeletal density is measured by He pycnometry.

Pore volume is defined as the volume of Hg that penetrates the supported catalyst at 60,000 lbs force pressure or 266,893 Newton as measured with a mercury porosimeter.

The BET surface area is determined indirectly by measuring the amount of nitrogen adsorbed on the surface of the catalyst.

The support of the supported catalyst in the steam-hydrocarbon reforming processes may consist essentially of alumina, calcium aluminate, magnesium aluminate, or mixtures thereof. The support may contain less than 1 mass % of a material other than alumina, calcium aluminate, or magnesium aluminate.

Since potassium-promoted catalysts may leach out by steam during steam-hydrocarbon reforming, the supported catalyst in the steam-hydrocarbon reforming processes may comprise less than 0.1% potassium to avoid leaching of potassium.

The reactor may be an adiabatic prereformer. The reaction conditions sufficient to react the feed gas may include a temperature ranging from 450° C. to 650° C. and a pressure ranging from 500 kPa to 5000 kPa.

The reactor may be a nonadiabatic prereformer. The reaction conditions sufficient to react the feed gas may include a temperature ranging from 450° C. to 750° C. and a pressure ranging from 500 kPa to 5000 kPa.

The reactor may be a reformer tube in a combustion-fired primary reformer. The reaction conditions sufficient to react the feed gas may include a temperature ranging from 550° C. to 1000° C. or ranging from 700° C. to 1000° C. and a pressure ranging from 500 kPa to 5000 kPa. The feed gas to the reformer tube in a combustion-fired primary reformer may be essentially free of hydrocarbons other than methane, as for example, a prereformed feed gas. As used herein, "essentially free" of hydrocarbons other than methane means having a concentration less than 0.5 mole % of the hydrocarbons other than methane.

Energy for the reforming reaction in the combustion-fired primary reformer may be supplied by combusting a fuel with an oxidant gas mixture in the combustion section of the reformer. An oxidant gas mixture containing oxygen and a fuel are introduced into the combustion section of the reformer through burners. The fuel and the oxygen are combusted to form combustion product gases external tot the reformer tubes. The combustion product gases are withdrawn from the combustion section of the reformer and may be passed to a convection section of the reformer to provide heating to other process gas streams.

EXAMPLES

Catalysts for Control Samples

A commercially available prereforming catalyst and a number of reforming catalysts supported on calcium aluminate, lanthanum-promoted or potassium-promoted calcium aluminate and lanthanum-promoted alumina were acquired and tested to provide control data. In addition, a sample catalyst supported on lanthanum-promoted alumina was prepared by using alumina starting material where the alumina is not lanthanum stabilized alumina. The catalyst samples were evaluated for nickel content, porosity and pore volume and were tested for their activity for reforming methane and natural gas.

Procedure for Preparing Catalyst Samples

Lanthanum-promoted alumina catalyst support material was prepared by mixing γ-alumina or α-alumina (where the γ-alumina or α-alumina is not lanthanum stabilized γ-alumina or α-alumina) with lanthanum hydroxide, hydrated alumina (boehmite), and graphite in the desired proportions, pressed into pellets of desired shape and size, and calcined in air in a stepwise manner up to a temperature of 1,000° C. The calcined support material was cooled and soaked in a nickel nitrate solution and calcined again at 650° C.

Lanthanum-promoted alumina-based support materials according to the present method were prepared by mixing lanthanum-stabilized γ-alumina or lanthanum-stabilized θ-alumina with a lubricant such as graphite, METHOCEL™ or magnesium stearate in the desired proportions, pressed into pellets of desired shape and size, and calcined in air in a stepwise manner up to a temperature of 1,000° C. The calcined support material was cooled and soaked in a nickel nitrate solution and calcined again at 650° C. to produce highly porous and high pore volume nickel catalyst supported on lanthanum-promoted alumina.

Calcium aluminate-based support materials according to the present method were produced by mixing lanthanum-stabilized γ-alumina or θ-alumina with α-alumina where the α-alumina was not lanthanum stabilized α-alumina), calcium-containing material such as calcium carbonate, and a lubricant such as graphite, METHOCEL™ or magnesium stearate in the desired proportions, pressed into pellets of desired shape and size, and calcined in air in a stepwise manner up to a temperature of 1,000° C. to facilitate decomposition of calcium carbonate to calcium oxide and reaction between calcium oxide and alumina to form in-situ calcium aluminate. The calcined support material was cooled and soaked in a nickel nitrate solution and calcined again at 650° C. to produce highly porous and high pore volume nickel catalyst supported on calcium aluminate. Similarly, highly porous and high pore volume nickel catalyst supported on magnesium aluminate may be prepared using magnesium carbonate in place of calcium carbonate.

Nickel catalyst on a lanthanum-promoted calcium aluminate support was prepared by mixing calcium carbonate and alumina, forming pellets of desired shape and size, and then calcining the pellets. They were not prepared by using a preformed calcium aluminate support. The calcium carbonate decomposed during the calcination step, causing outgassing of $CO_2$ that was responsible for further improving porosity and pore volume of the final catalysts. The amount of calcium carbonate mixed with alumina should be less than the amount required to stoichiometrically produce calcium aluminate in the form of $CaAl_2O_4$.

The catalyst samples prepared according to the claimed method were evaluated for nickel content, porosity, and pore volume. The catalyst samples were also tested to determine their activity for reforming methane and natural gas.

Procedure for Testing the Performance of Catalyst Samples

A 22.2 mm (0.875 inch) inside diameter reactor which is heated electrically from outside the reactor was used to determine catalytic activity of catalyst samples for reforming of methane and natural gas. A desired amount of catalyst pellets were loaded into the reactor. The reactor was heated close to the desired set point temperature under a flowing mixture of (2000 sccm) of nitrogen and (50 sccm) of hydrogen at a constant operating pressure of 2.67 MPa (400 psig) through the reactor, where "sccm" is standard cubic centimeters per minute, where standard conditions are 0° C. and 1 atmosphere pressure. The catalyst was reduced or conditioned for two hours under the flow of the nitrogen and hydrogen mixture. Thereafter, a gaseous feed mixture containing 6000 sccm of steam, 2000 sccm of pure methane or natural gas and 50 sccm of hydrogen was passed through the reactor to carry out the reforming reaction. The natural gas used in the experiments contained methane along with 3 vol. % ethane, 2 vol. % propane, and 1 vol. % butane. The reforming reaction was carried out at four different furnace set point temperatures ranging from 550 to 750° C. The product gas composition and flow rate were recorded periodically to perform the material balance and determine the rate of hydrocarbon reaction to form CO, $CO_2$, and $H_2$ and conversion of heavy hydrocarbons such as ethane, propane and butane to methane, CO, $CO_2$ and $H_2$.

Example 1

Control Sample

Several pellets of commercial prereforming nickel catalyst weighing 3.3 g were loaded into the reactor and tested for hydrocarbon conversion activity using the procedure described above. The catalyst pellets contained ~50% Ni calculated as NiO and had 47% porosity and 0.3 cc/g pore volume, as shown in Table 1. The catalyst sample resulted in methane and natural gas reaction rate of 0.24 and 0.30 moles/gram catalyst/hr, respectively, at 700° C. furnace temperature as shown in Table 2. Furthermore, the catalyst provided 57%, 69%, and 77% conversion of ethane, propane and butane, respectively, present in the natural gas at 700° C. furnace temperature as shown in Table 3. This example showed that a commercial prereforming catalyst is effective in converting heavy hydrocarbons such as ethane, propane and butane, which may be present in the natural gas.

Example 2

Control Sample

A pellet of commercial reforming nickel catalyst supported on La-promoted alpha alumina weighing 4.8 g was loaded into the reactor and tested for hydrocarbon conversion activity using the procedure described earlier. This catalyst sample was prepared by the supplier using the procedure disclosed in U.S. Pat. Nos. 4,469,815 and 4,530,918. The catalyst pellet contained 13.8% nickel as NiO and had ~39% porosity and 0.27 cc/g pore volume, as shown in Table 1. Furthermore, it contained NiO, $\alpha$-$Al_2O_3$ and $La_2O_3$, as determined by x-ray diffraction analysis. The catalyst sample resulted in methane and natural gas reaction rate of 0.10 and 0.13 mol/gram catalyst/hr, respectively, at 700° C. furnace temperature as shown in Table 2. Furthermore, the catalyst provided 52%, 49%, and 64% conversion of ethane, propane and butane, respectively, present in the natural gas at 700° C. furnace temperature as shown in Table 3. This example showed that a commercial reforming catalyst on La-promoted alumina support is marginally effective in converting methane and natural gas compared to the prereforming catalyst. It was effective in converting heavy hydrocarbons such as ethane, propane and butane present in the natural gas, but not as effective as a commercial prereforming catalyst.

Example 3

Control Sample

A mixture was formed by mixing 55 g $\alpha$-alumina, 8.21 g boehmite binder, 2.24 g lanthanum hydroxide, and 0.61 g graphite powders. The mixture was pressed to prepare pellets that were ~7 mm in diameter and 3-4 mm in height. The pellets were dried at 120° C. and then calcined in three steps in a controlled manner. They were heated at 2° C./minute from room temperature to 600° C. in a furnace where the pellets were exposed to air. The calcination temperature was maintained at 600° C. for 30 minutes to burn off pore former and consolidate the structure of the pellets. The pellets were then heated at a heating rate of 0.5° C./minute from 600° C. to 700° C. The calcination temperature was maintained at 700° C. for 30 minutes to further consolidate the structure of the pellets. The pellets were then heated at a heating rate of 0.5° C./minute from 700° C. to 1,000° C. The calcination temperature was maintained at 1,000° C. for 2 hours. The pellets were then cooled and soaked in a nickel nitrate solution, dried at room temperature and calcined again at 650° C. to produce nickel catalyst on La-promoted alumina support.

Several pellets of nickel catalyst supported on La-promoted alumina weighing 2.65 g were loaded into the reactor and tested for hydrocarbon conversion activity using the procedure described earlier. The catalyst pellets contained 13.8% nickel as NiO and had ~54% porosity and 0.28 cc/g pore volume, as shown in Table 1. Furthermore, they contained NiO, $\alpha$-alumina and $LaAlO_3$, as determined by x-ray diffraction analysis. The catalyst sample resulted in methane and natural gas reaction rate of 0.16 and 0.22 mol/gram catalyst/ hr, respectively, at 700° C. furnace temperature as shown in Table 2. These reaction rates are higher than the values noted with the commercially available nickel catalyst supported on La-promoted alumina in Example 2. The catalyst provided 16%, 48%, and 63% conversion of ethane, propane and butane, respectively, present in the natural gas at 700° C. furnace temperature as shown in Table 3. These values are slightly lower than the ones noted with nickel catalyst supported on La-promoted alumina in Example 2. They were also lower than those noted with commercial prereforming catalyst in Example 1.

Example 4

Control Sample

A pellet of commercial reforming nickel catalyst supported on calcium aluminate weighing 2.2 g was loaded into the reactor and tested for hydrocarbon conversion activity using the procedure described earlier. The catalyst pellet contained 14% nickel as NiO and had ~37% porosity and 0.17 cc/g pore volume, as shown in Table 1. Furthermore, it contained NiO, $Al_2O_3$ and $CaAl_2O_4$, as determined by x-ray diffraction analysis. The catalyst sample resulted in methane and natural gas reaction rate of 0.18 and 0.22 mol/gram catalyst/hr, respectively, at 700° C. furnace temperature as shown in Table 2. These values are similar to the ones noted with nickel catalyst on La-promoted alumina in Example 3. Furthermore, the catalyst provided 15%, 34%, and 44% conversion of ethane, propane and butane, respectively, present in the natural gas at 700° C. furnace temperature as shown in Table 3. These values are much lower than ones noted for nickel catalyst on La-promoted alumina in Example 3 and with prereforming catalyst in Example 1. This example showed that a commercial nickel reforming catalyst on unpromoted calcium aluminate support is effective in converting methane and natural gas. However, it was not effective in converting heavy hydrocarbons such as ethane, propane and butane present in the natural gas compared to nickel catalyst on La-promoted alumina support.

Example 5

Control Sample

A pellet of commercial reforming nickel catalyst supported on potassium promoted calcium aluminate weighing 2.7 g was loaded into the reactor and tested for hydrocarbon conversion activity using the procedure described above. The catalyst pellet contained 24% nickel as NiO and had ~34% porosity and 0.15 cc/g pore volume, as shown in Table 1. Furthermore, it contained NiO and $CaAl_2O_4$, as determined by x-ray diffraction analysis. The catalysts sample resulted in methane and natural gas reaction rate of 0.20 and 0.24 mole/g catalyst/hr, respectively, at 700° C. furnace temperature as shown in Table 2. These reaction rates are very close to the values noted with catalyst on unpromoted calcium aluminate support in Example 4. The catalyst provided 21%, 49%, and 60% conversion of ethane, propane and butane, respectively, present in the natural gas at 700° C. furnace temperature as shown in Table 3. This example showed that a commercial reforming catalyst on potassium promoted calcium aluminate support is more effective in converting heavy hydrocarbons such as ethane, propane and butane present in the natural gas compared to nickel catalyst on unpromoted calcium aluminate support.

Example 6

Control Sample

A pellet of commercial reforming nickel catalyst supported on La-promoted calcium aluminate weighing 3.0 g was loaded into the reactor and tested for hydrocarbon conversion activity using the procedure described above. The catalyst pellet contained 17% nickel as NiO and had ~32% porosity and 0.14 cc/g pore volume, as shown in Table 1. Furthermore, it contained NiO and $CaAl_2O_4$, as determined by x-ray diffraction analysis. The catalyst sample resulted in methane and natural gas reaction rate of 0.14 and 0.24 mole/g catalyst/hr, respectively, at 700° C. furnace temperature as shown in Table 2). These reaction rates are close to the values noted with nickel catalysts on unpromoted and potassium promoted calcium aluminate support in Examples 4 and 5. The catalyst provided 13%, 44%, and 60% conversion of ethane, propane and butane, respectively, present in the natural gas at 700° C. furnace temperature as shown in Table 3. This example showed that a commercial reforming catalyst on La-promoted calcium aluminate support is as effective in converting heavy hydrocarbons such as ethane, propane and butane present in the natural gas as a reforming catalyst on potassium promoted calcium aluminate support.

Example 7

Control Sample

A mixture was formed by mixing 15 g alpha alumina, 100 g calcium carbonate and 2 g METHOCEL™ powders. The amount of calcium present in the mixture was far in excess to that required to produce stoichiometric amount of calcium aluminate in the form of $CaAl_2O_4$. This means that the amount of calcium in the mixture was extremely high to react with all the alumina present in the mixture and provide a mixture of calcium aluminate and calcium oxide. The mixture was pressed to prepare pellets that were ~7 mm in diameter and 3-4 mm in height. The pellets were dried at 120° C. and then calcined in three steps in a controlled manner. The pellets were heated in a furnace having an air atmosphere at 2° C./minute from room temperature to 600° C. The calcination temperature was maintained at 600° C. for 30 minutes to burn off pore former and consolidate the structure of the pellets. The pellets were then heated at a heating rate of 0.5° C./minute from 600° C. to 700° C. The calcination temperature was maintained at 700° C. for 30 minutes to further consolidate the structure of the pellets. The pellets were then heated at a heating rate of 0.5° C./minute from 700° C. to 1,000° C. The calcination temperature was maintained at 1,000° C. for 2 hours. The pellets were then cooled and soaked in a nickel nitrate solution, dried at room temperature and calcined again at 650° C. to produce nickel catalyst on calcium aluminate support.

Several pellets of nickel catalyst supported on La-promoted alumina having a total weight of 1.0 g were loaded into the reactor and tested for hydrocarbon conversion activity using the procedure described above. The catalyst pellets contained 18.2% nickel as NiO. Furthermore, they contained NiO, free CaO, $CaAl_2O_4$ and $Ca_3Al_2O_6$, as determined by x-ray diffraction analysis. Surprisingly, the sample showed no activity for reforming methane at 750° C.

This example showed that a nickel catalyst supported on calcium rich calcium aluminate is not desirable for reforming hydrocarbons.

TABLE 1

|  | Example 1 Commercial Prereforming Catalyst | Example 2 Commercial Reforming Catalyst | Example 3 Prepared Reforming Catalyst | Example 4 Commercial Reforming Catalyst |
|---|---|---|---|---|
|  |  | Support |  |  |
|  | None | La-promoted α-alumina | La-promoted α-alumina | Calcium Aluminate |
| wt % NiO | 49.8 | 13.8 | 13.8 | 14 |
| Porosity, % | 47 | 39.4 | 54.2 | 36.8 |
| Pore Vol., cc/g | 0.3 | 0.27 | 0.28 | 0.17 |
| BET Surface Area, m²/g | 80 | 4.4 | 13.8 | — |

|  | Example 5 Commercial Prereforming Catalyst | Example 6 Commercial Reforming Catalyst |
|---|---|---|
|  | Support |  |
|  | K-promoted Calcium Aluminate | La-promoted Calcium Aluminate |
| wt % NiO | 24.4 | 17.3 |
| Porosity, % | 34.4 | 32.3 |
| Pore Vol., cc/g | 0.15 | 0.14 |
| BET Surface Area, m²/g | 5 | 33.4 |

TABLE 2

| | Reaction Rate, (mol/$g_{cat}$/h) | | | | | | | |
|---|---|---|---|---|---|---|---|---|
| | Example 1 | | Example 2 | | Example 3 | | Example 4 | |
| | Reactant | | | | | | | |
| Temperature | $CH_4$ | Nat. gas | $CH_4$ | Nat. gas | $CH_4$ | Nat. gas | $CH_4$ | Nat. gas |
| 550° C. | 0.10 | 0.13 | 0.04 | 0.05 | — | — | 0.06 | 0.09 |
| 650° C. | 0.19 | 0.22 | 0.08 | 0.09 | 0.12 | 0.16 | 0.14 | 0.16 |
| 700° C. | 0.24 | 0.30 | 0.10 | 0.13 | 0.16 | 0.22 | 0.18 | 0.22 |
| 750° C. | — | — | 0.13 | — | 0.25 | — | 0.23 | — |

| | Reaction Rate, (mol/$g_{cat}$/h) | | | |
|---|---|---|---|---|
| | Example 5 | | Example 6 | |
| | Reactant | | | |
| Temperature | $CH_4$ | Nat. gas | $CH_4$ | Nat. gas |
| 550° C. | 0.08 | 0.10 | 0.06 | 0.10 |
| 650° C. | 0.15 | 0.18 | 0.11 | 0.18 |
| 700° C. | 0.20 | 0.24 | 0.14 | 0.24 |
| 750° C. | 0.26 | — | 0.19 | — |

TABLE 3

| | Conversion, % | | | | | | | |
|---|---|---|---|---|---|---|---|---|
| | Example 1 | | Example 2 | | Example 3 | | Example 4 | |
| Hydrocarbon | Temperature, ° C. | | | | | | | |
| | 550 | 700 | 550 | 700 | 550 | 700 | 550 | 700 |
| Ethane | 42 | 57 | 17 | 52 | — | 16 | 7 | 15 |
| Propane | 42 | 69 | 18 | 49 | — | 48 | 7 | 34 |
| Butane | 39 | 77 | 17 | 64 | — | 63 | 1 | 44 |

TABLE 3-continued

| | Conversion, % | | | |
|---|---|---|---|---|
| | Example 5 | | Example 6 | |
| Hydro- | Temperature, ° C. | | | |
| carbon | 550 | 700 | 550 | 700 |
| Ethane | 13 | 21 | 12 | 13 |
| Propane | 18 | 49 | 12 | 44 |
| Butane | 14 | 60 | 10 | 60 |

Example 8

This example showed preparation and performance of nickel catalyst on La-promoted alumina support according to the present method. A mixture was formed by mixing 20 g La-promoted alumina and 0.23 g magnesium stearate powders. The La-promoted, hydrothermally stable alumina powder designated as MI-486 was acquired from Rhodia (Cranbury, N.J.). It contained ~3.6 weight % lanthanum oxide with balance being θ-alumina and some minor impurities. The mixture was pressed to prepare pellets that were ~7 mm in diameter and 3-4 mm in height. The pellets were calcined using the procedure similar to the one described in Example 3. The pellets were then cooled and soaked in a nickel nitrate solution, dried at room temperature and calcined again at 650° C. to produce nickel catalyst on La-promoted alumina support.

Several pellets of nickel catalyst supported on La-promoted alumina having a total weight of 1.4 g were loaded into the reactor and tested for hydrocarbon conversion activity using the procedure described above. The catalyst pellets contained 29.2% nickel as NiO and had ~72% porosity and 0.61 cc/g pore volume, as shown in Table 4. Furthermore, they contained NiO and θ-alumina, as determined by x-ray diffraction analysis. The catalyst sample resulted in methane and natural gas reaction rate of 0.45 and 0.57 mole/g catalyst/hr, respectively, at 700° C. furnace temperature as shown in Table 5. These reaction rates are considerably higher than the values noted with all catalyst samples described in Examples 2-6 with reforming catalysts. They are even higher than that provided by commercial prereforming catalyst in Example 1. The catalyst provided a net 44%, 62%, and 72% conversion of ethane, propane and butane, respectively, at 700° C. furnace temperature as shown in Table 6. These values are very close to the ones noted with commercial prereforming catalyst. This example showed that a nickel catalyst on highly porous and high pore volume La-promoted alumina support is more effective in converting methane and natural gas than commercially available prereforming and reforming catalysts and is as effective in converting heavy hydrocarbons such as ethane, propane and butane present in the natural gas as a commercial prereforming catalyst.

Example 9

This example showed preparation and performance of nickel catalyst on La-promoted calcium aluminate support according to the present method. A mixture was formed by mixing 14 g La-promoted alumina, 25 g α-alumina, 4.3 g calcium carbonate, and 2 g METHOCEL™ powders. The La-promoted, hydrothermally stable alumina powder designated as MI-386 was acquired from Rhodia (Cranbury, N.J.). It contained ~4 weight % lanthanum oxide with balance being γ-alumina and some minor impurities. The amount of calcium present in the mixture was close to 11% of the amount required to produce stoichiometric amount of calcium aluminate in the form of $CaAl_2O_4$. This means that the amount of calcium in the mixture was not high enough to react with all the alumina present in the mixture. The mixture was pressed to prepare pellets that were ~7 mm in diameter and 3-4 mm in height. The pellets were calcined using the procedure similar to the one described in Example 3. The pellets were then cooled and soaked in a nickel nitrate solution, dried at room temperature and calcined again at 650° C. to produce nickel catalyst on La-promoted calcium aluminate support.

Several pellets of nickel catalyst supported on La-promoted calcium aluminate weighing 1.8 g were loaded into the reactor and tested for hydrocarbon conversion activity using the procedure described earlier. The catalyst pellets contained 19.2% nickel as NiO and had ~64.5% porosity and 0.44 cc/g pore volume, as shown in Table 4. Furthermore, as expected, they contained NiO, α-alumina, and $CaAl_2O_4$, as determined by x-ray diffraction analysis. The catalyst sample resulted in methane and natural gas reaction rate of 0.38 and 0.47 mole/g catalyst/hr, respectively, at 700° C. furnace temperature as shown in Table 5. These reaction rates are slightly lower than the catalyst in Example 8, but are considerably higher than the values noted with all catalyst samples described in Examples 1 to 6. The catalyst provided a net 45%, 63%, and 72% conversion of ethane, propane and butane, respectively, at 700° C. furnace temperature as shown in Table 6. These values were very close to the ones noted with commercial prereforming catalyst in Example 1.

This example showed that a nickel catalyst on highly porous and high pore volume La-promoted calcium aluminate support is more effective in converting methane and natural gas than commercially available prereforming and reforming catalysts and is as effective in converting heavy hydrocarbons such as ethane, propane and butane present in the natural gas as a commercial prereforming catalyst.

Example 10

This example showed preparation and performance of nickel catalyst on La-promoted calcium aluminate support according to the present method. The preparation procedure described in Example 9 was repeated to prepare another batch of nickel catalyst on La-promoted calcium aluminate support.

Several pellets of nickel catalyst supported on La-promoted calcium aluminate weighing 1.9 g were loaded into the reactor and tested for hydrocarbon conversion activity using the procedure described earlier. The catalyst pellets contained 21.4% nickel as NiO and had ~65.5% porosity and 0.46 cc/g pore volume, as shown in Table 4. Furthermore, they contained NiO, α-alumina, and $CaAl_2O_4$, as determined by x-ray diffraction analysis. The catalyst sample resulted in methane and natural gas reaction rate of 0.33 and 0.40 mole/g catalyst/hr, respectively, at 700° C. furnace temperature as shown in Table 5. These reaction rates are slightly lower than the catalyst in Examples 8 and 9, but are considerably higher than the values noted with all catalyst samples described in Examples 1 to 6. The catalyst provided a net 55%, 73%, and 81% conversion of ethane, propane and butane, respectively, at 700° C. furnace temperature as shown in Table 6. These values are higher than the ones noted with commercial prereforming catalyst in Example 1.

This example showed that a nickel catalyst on highly porous and high pore volume La-promoted calcium aluminate support is more effective in converting methane and natural gas than commercially available prereforming and reforming catalysts.

Example 11

This example showed preparation and performance of nickel catalyst on La-promoted calcium aluminate support according to the present method. A mixture was formed by mixing 14 g La-promoted alumina, 25 g α-alumina, 4.3 g calcium carbonate, and 2 g METHOCEL™ powders. The La-promoted, hydrothermally stable alumina powder designated as MI-486 was acquired from Rhodia (Cranbury, N.J.). It contained ~3.6 weight % lanthanum oxide with balance being θ-alumina and some minor impurities. The amount of calcium present in the mixture was close to 11% of the amount required to produce stoichiometric amount of calcium aluminate in the form of $CaAl_2O_4$. This means that the amount of calcium in the mixture was not high enough to react with all the alumina present in the mixture. The mixture was pressed to prepare pellets that were ~7 mm in diameter and 3-4 mm in height. The pellets were calcined using the procedure similar to the one described in Example 3. The pellets were then cooled and soaked in a nickel nitrate solution, dried at room temperature and calcined again at 650° C. to produce nickel catalyst on La-promoted calcium aluminate support.

Several pellets of nickel catalyst supported on La-promoted calcium aluminate weighing 2.1 g were loaded in the reactor and tested for hydrocarbon conversion activity using the procedure described earlier. The catalyst pellets contained 19.4% nickel as NiO and had ~60.7% porosity and 0.45 cc/g pore volume, as shown in Table 4. Furthermore, they contained NiO, α-alumina, and $CaAl_2O_4$, as determined by x-ray diffraction analysis. The catalyst sample resulted in methane and natural gas reaction rate of 0.36 and 0.43 mole/g catalyst/hr, respectively, at 700° C. furnace temperature as shown in Table 5. These reaction rates are slightly lower than the catalyst in Example 8, but are considerably higher than the values noted with all catalyst samples described in Examples 1 to 6. The catalyst provided a net 54%, 70%, and 78% conversion of ethane, propane and butane, respectively, at 700° C. furnace temperature as shown in Table 6. These values are slightly higher than the ones noted with commercial prereforming catalyst in Example 1.

This example showed that a nickel catalyst on highly porous and high pore volume La-promoted calcium aluminate support is more effective in converting methane and natural gas than commercially available prereforming and reforming catalysts and is as effective in converting heavy hydrocarbons such as ethane, propane and butane present in the natural gas as a commercial prereforming catalyst.

Example 12

This example showed preparation and performance of nickel catalyst on La-promoted calcium aluminate support according to the present method. The preparation procedure described in Example 11 was repeated to prepare another batch of nickel catalyst on La-promoted calcium aluminate support.

Several pellets of nickel catalyst supported on La-promoted calcium aluminate weighing 2.0 g were loaded in the reactor and tested for hydrocarbon conversion activity using the procedure described earlier. The catalyst pellets contained 21.6% nickel as NiO and had ~66.1% porosity and 0.45 cc/g pore volume, as shown in Table 4. Furthermore, they contained NiO, α-alumina, and $CaAl_2O_4$, as determined by x-ray diffraction analysis. The catalyst sample resulted in methane and natural gas reaction rate of 0.32 and 0.40 mole/g catalyst/hr, respectively, at 700° C. furnace temperature as shown in Table 5. These reaction rates are slightly lower than the catalyst in Example 8, but are considerably higher than the values noted with all catalyst samples described in Examples 1 to 6. The catalyst provided a net 40%, 64%, and 74% conversion of ethane, propane and butane, respectively, at 700° C. furnace temperature as shown in Table 6. These values are very close to the ones noted with commercial prereforming catalyst in Example 1.

This example showed that a nickel catalyst on highly porous and high pore volume La-promoted calcium aluminate support is more effective in converting methane and natural gas than commercially available prereforming and reforming catalysts and is as effective in converting heavy hydrocarbons such as ethane, propane and butane present in the natural gas as a commercial prereforming catalyst.

Example 13

This example showed preparation and performance of nickel catalyst on La-promoted calcium aluminate support according to the present method. A mixture was formed by mixing 21 g La-promoted alumina, 33 g α-alumina, 15 g calcium carbonate, and 2 g METHOCEL™ powders. The La-promoted, hydrothermally stable alumina powder designated as MI-486 was acquired from Rhodia (Cranbury, N.J.). It contained ~3.6 weight % lanthanum oxide with balance being θ-alumina and some minor impurities. The amount of calcium present in the mixture was close to 28% of the amount required to produce stoichiometric amount of calcium aluminate in the form of $CaAl_2O_4$. This means that the amount of calcium in the mixture was not high enough to react with all the alumina present in the mixture. The mixture was pressed to prepare pellets that were ~7 mm in diameter and 3-4 mm in height. The pellets were calcined using the procedure similar to the one described in Example 3. The pellets were then cooled and soaked in a nickel nitrate solution, dried at room temperature and calcined again at 650° C. to produce nickel catalyst on La-promoted calcium aluminate support.

Several pellets of nickel catalyst supported on La-promoted calcium aluminate weighing 2.0 g were loaded in the reactor and tested for hydrocarbon conversion activity using the procedure described earlier. The catalyst pellets contained 19.4% nickel as NiO and had ~60.7% porosity and 0.38 cc/g pore volume, as shown in Table 4. Furthermore, they contained NiO, α-alumina, and $CaAl_2O_4$, as determined by x-ray diffraction analysis. The catalyst sample resulted in methane and natural gas reaction rate of 0.34 and 0.42 mole/g catalyst/hr, respectively, at 700° C. furnace temperature as shown in Table 5. These reaction rates are slightly lower than the catalyst in Example 8, but are similar to values noted in Examples 10 and 12 and considerably higher than the values noted with all control catalyst samples described in Examples 1 to 6. The catalyst provided a net 46%, 64%, and 74% conversion of ethane, propane and butane, respectively, at 700° C. furnace temperature as shown in Table 6. These values are close to the ones noted with commercial prereforming catalyst.

This example showed that a nickel catalyst on highly porous and high pore volume La-promoted calcium aluminate support is more effective in converting methane and natural gas than commercially available prereforming and reforming catalysts and is as effective in converting heavy hydrocarbons such as ethane, propane and butane present in the natural gas as a commercial prereforming catalyst.

TABLE 4

|  | Example 8 Prepared Catalyst | Example 9 Prepared Catalyst | Example 10 Prepared Catalyst | Example 11 Prepared Catalyst |
|---|---|---|---|---|
|  | Support | | | |
|  | La-promoted α-alumina | La-promoted calcium aluminate | La-promoted calcium aluminate | La-promoted calcium aluminate |
| wt % NiO | 29.2 | 19.4 | 21.4 | 19.4 |
| Porosity, % | 72.2 | 64.5 | 65.5 | 60.7 |
| Pore Vol., cc/g | 0.61 | 0.44 | 0.46 | 0.45 |
| BET Surface Area, m²/g | 69.2 | 37.7 | 41.8 | 45.6 |

|  | Example 12 Prepared Catalyst | Example 13 Prepared Catalyst |
|---|---|---|
|  | Support | |
|  | La-promoted calcium aluminate | La-promoted calcium aluminate |
| wt % NiO | 21.6 | 19.4 |
| Porosity, % | 66.1 | 60.7 |
| Pore Vol., cc/g | 0.45 | 0.38 |
| BET Surface Area, m²/g | 32.2 | 31.1 |

TABLE 5

| | Reaction Rate, (mol/$g_{cat}$/h) | | | | | | | |
|---|---|---|---|---|---|---|---|---|
| | Example 8 | | Example 9 | | Example 10 | | Example 11 | |
| | Reactant | | | | | | | |
| Temperature | $CH_4$ | Nat. gas | $CH_4$ | Nat. gas | $CH_4$ | Nat. gas | $CH_4$ | Nat. gas |
| 550° C. | 0.15 | 0.21 | — | — | 0.12 | 0.15 | — | — |
| 650° C. | 0.34 | 0.42 | 0.30 | 0.36 | 0.25 | 0.30 | 0.27 | 0.33 |
| 700° C. | 0.45 | 0.57 | 0.38 | 0.47 | 0.33 | 0.40 | 0.36 | 0.43 |
| 750° C. | 0.59 | — | 0.50 | — | 0.43 | — | 0.47 | — |

| | Reaction Rate, (mol/$g_{cat}$/h) | | | |
|---|---|---|---|---|
| | Example 12 | | Example 13 | |
| | Reactant | | | |
| Temperature | $CH_4$ | Nat. gas | $CH_4$ | Nat. gas |
| 550° C. | 0.11 | 0.14 | 0.12 | 0.16 |
| 650° C. | 0.24 | 0.29 | 0.26 | 0.32 |
| 700° C. | 0.32 | 0.40 | 0.34 | 0.42 |
| 750° C. | 0.42 | — | 0.43 | — |

TABLE 6

| | Conversion, % | | | | | | | |
|---|---|---|---|---|---|---|---|---|
| | Example 1 | | Example 2 | | Example 3 | | Example 4 | |
| Hydrocarbon | Temperature, ° C. | | | | | | | |
| | 550 | 700 | 550 | 700 | 550 | 700 | 550 | 700 |
| Ethane | 34 | 44 | — | 45 | 28 | 55 | — | 64 |
| Propane | 33 | 62 | — | 63 | 29 | 73 | — | 70 |
| Butane | 34 | 72 | — | 72 | 29 | 81 | — | 78 |

TABLE 6-continued

| | Conversion, % | | | |
|---|---|---|---|---|
| | Example 5 | | Example 6 | |
| Hydrocarbon | Temperature, ° C. | | | |
| | 550 | 700 | 550 | 700 |
| Ethane | 29 | 40 | 35 | 46 |
| Propane | 33 | 64 | 39 | 64 |
| Butane | 30 | 74 | 37 | 74 |

Although the present invention has been described as to specific embodiments or examples, it is not limited thereto, but may be changed or modified into any of various other forms without departing from the scope of the invention as defined in the accompanying claims.

What is claimed is:

1. A method of making a supported catalyst comprising nickel for reforming of steam and hydrocarbons, the method comprising, in sequence:
(a) forming a mixture comprising 26 to 99.5 mass % of at least one of lanthanum-stabilized gamma-alumina and lanthanum-stabilized theta-alumina, 0 to 66 mass alpha-alumina, 0 to 25 mass % of at least one of calcium carbonate and magnesium carbonate, and 0.5 to 5 mass % of at least one of graphite, a cellulose ether, and magnesium stearate;
(b) forming pellets from the mixture;
(c) calcining the pellets in one or more heating stages wherein the pellets are heated to at least 975° C. during at least one of the one or more heating stages and wherein the pellets are not heated above 1100° C. during calcining;
(d) cooling the pellets to between 20° C. and 30° C.;
(e) soaking the pellets in an aqueous nickel-containing solution comprising at least one of nickel nitrate, nickel hydroxide, and nickel acetate;
(f) removing the pellets from the nickel-containing solution;
(g) baking the pellets wherein the pellets are heated to at least 625° C. wherein the pellets are not heated above 800° C. during baking; and
(h) cooling the pellets to between 20° C. and 30° C. to make the supported catalyst comprising nickel;
wherein the one or more heating stages comprise:
(i) a first heating step wherein the pellets are heated from a first temperature to at least 575° C. during a first heating time ranging from 1.5 hours to 10.5 hours, wherein the first temperature is within a first temperature range between 5° C. and 50° C., and wherein the pellets are heated to less than 625° C. during the first heating step;
(ii) maintaining the temperature of the pellets between 575° C. and 625° C. for a first time period of between 5 minutes and 60 minutes;
(iii) a second heating step wherein the pellets are heated from 625° C. to at least 675° C. during a second heating time ranging from 0.5 hours to 17 hours, wherein the pellets are heated to less than 725° C. during the second heating step;
(iv) maintaining the temperature of the pellets between 675° C. and 725° C. for a second time period of between 5 minutes and 60 minutes;
(v) a third heating step wherein the pellets are heated from 725° C. to at least 975° C. during a third heating time ranging from 1 hours to 50 hours, wherein the pellets are heated to less than 1025° C. during the third heating step; and (vi) maintaining the temperature of the pellets between 975° C. and 1025° C. for a third time period of between 30 minutes and 180 minutes;

wherein the step of baking comprises heating the pellets from a second temperature to at least 625° C. during a fourth heating time ranging from 1 hour to 22 hours, wherein the second temperature is within a second temperature range of between 20° C. and 30° C. and wherein the pellets are heated to less than 675° C. during the fourth heating step; and wherein the pellets are exposed to an atmosphere comprising oxygen during one or more of the one or more heating steps of calcining; and wherein the supported catalyst has a porosity between 55% and 75%, a pore volume between 0.3 cc/g and 0.65 cc/g and a BET surface area of between 20 and 80 m$^2$/g.

2. The method of claim 1 wherein the atmosphere comprises 15 mole % to 25 mole % oxygen and 75 mole % to 85 mole % nitrogen.

3. The method of claim 1 wherein the atmosphere is air.

4. The method of claim 1 wherein the aqueous nickel-containing solution comprises a nickel nitrate solution containing 50 to 250 mg Ni/ml.

5. The method of claim 1 wherein the mixture comprises 95 to 99.5 mass % of the at least one of lanthanum-stabilized γ-alumina and lanthanum-stabilized θ-alumina.

6. The method of claim 1 wherein the mixture comprises 95 to 99.5 mass % of the at least one of lanthanum-stabilized γ-alumina and lanthanum-stabilized θ-alumina, 0 mass % α-alumina, 0 mass % calcium carbonate, and 0 mass % magnesium carbonate.

7. The method of claim 1 wherein the mixture comprises 20 to 35 mass % of the at least one of lanthanum-stabilized γ-alumina and lanthanum-stabilized θ-alumina, 40 to 60 mass % α-alumina, and 5 to 25 mass % of the at least one of calcium carbonate and magnesium carbonate.

8. The method of claim 1 wherein the mixture comprises 20 to 35 mass % of the at least one of lanthanum-stabilized γ-alumina and lanthanum-stabilized θ-alumina, 40 to 60 mass % α-alumina, and 5 to 25 mass % calcium carbonate.

9. The method of claim 1 wherein the mixture comprises 20 to 35 mass % of the at least one of lanthanum-stabilized γ-alumina and lanthanum-stabilized θ-alumina, 40 to 60 mass % α-alumina, and 5 to 25 mass % magnesium carbonate.

10. The method of claim 1 wherein the mixture comprises less than 0.01 mass % potassium.

11. A steam-hydrocarbon reforming process comprising:
introducing a feed gas into a reactor containing a supported catalyst made by a method of making the supported catalyst comprising nickel for reforming of steam and hydrocarbons, reacting the feed gas in the presence of the supported catalyst under reaction conditions sufficient to react the feed gas and form a reformate in a reforming reaction, and withdrawing the reformate from the reactor, wherein the feed gas comprises steam and at least one hydrocarbon selected from the group consisting of C1 to C6 hydrocarbons, and wherein the supported catalyst has a porosity between 55% and 75% and a pore volume between 0.3 cc/g and 0.65 cc/g; and a BET surface area of between 20 and 80 m$^2$/g;

wherein the method of making the supported catalyst comprises, in sequence:
(a) forming a mixture comprising 20 to 99.5 mass % of at least one of lanthanum-stabilized γ-alumina and lanthanum-stabilized θ-alumina, 0 to 60 mass % α-alumina, 0 to 25 mass % of at least one of calcium carbonate and magnesium carbonate, and 0.5 to 5 mass % of at least one of graphite, a cellulose ether, and magnesium stearate;
(b) forming pellets from the mixture;
(c) calcining the pellets in one or more heating stages wherein the pellets are heated to at least 975° C. during at least one of the one or more heating stages and wherein the pellets are not heated above 1100° C. during calcining;
(d) cooling the pellets to between 20° C. and 30° C.;
(e) soaking the pellets in an aqueous nickel-containing solution comprising at least one of nickel nitrate, nickel hydroxide, and nickel acetate;
(f) removing the pellets from the nickel-containing solution;
(g) baking the pellets wherein the pellets are heated to at least 625° C. wherein the pellets are not heated above 800° C. during baking; and
(h) cooling the pellets to between 20° C. and 30° C. to make the supported catalyst comprising nickel;

wherein the one or more heating stages comprise:
(i) a first heating step wherein the pellets are heated from a first temperature to at least 575° C. during a first heating time ranging from 1.5 hours to 10.5 hours, wherein the first temperature is within a first temperature range between 5° C. and 50° C., and wherein the pellets are heated to less than 625° C. during the first heating step;
(ii) maintaining the temperature of the pellets between 575° C. and 625° C. for a first time period of between 5 minutes and 60 minutes;
(iii) a second heating step wherein the pellets are heated from 625° C. to at least 675° C. during a second heating time ranging from 0.5 hours to 17 hours,
wherein the pellets are heated to less than 725° C. during the second heating step;
(iv) maintaining the temperature of the pellets between 675° C. and 725° C. for a second time period of between 5 minutes and 60 minutes;
(v) a third heating step wherein the pellets are heated from 725° C. to at least 975° C. during a third heating time ranging from 1 hours to 50 hours, wherein the pellets are heated to less than 1025° C. during the third heating step; and
(vi) maintaining the temperature of the pellets between 975° C. and 1025° C. for a third time period of between 30 minutes and 180 minutes;

wherein the step of baking comprises heating the pellets from a second temperature to at least 625° C. during a fourth heating time ranging from 1 hour to 22 hours, wherein the second temperature is within a second temperature range of between 20° C. and 30° C. and wherein the pellets are heated to less than 675° C. during the fourth heating step; and wherein the pellets are exposed to an atmosphere comprising oxygen during one or more of the one or more heating steps of calcining.

* * * * *

UNITED STATES PATENT AND TRADEMARK OFFICE
CERTIFICATE OF CORRECTION

| | | |
|---|---|---|
| PATENT NO. | : 8,877,673 B2 | Page 1 of 1 |
| APPLICATION NO. | : 13/882543 | |
| DATED | : November 4, 2014 | |
| INVENTOR(S) | : Diwakar Garg et al. | |

It is certified that error appears in the above-identified patent and that said Letters Patent is hereby corrected as shown below:

Column 20, line 25 in the Claims:

Between the words "mass" and "alpha-" add a -- % -- sign.

Signed and Sealed this
Ninth Day of June, 2015

Michelle K. Lee
*Director of the United States Patent and Trademark Office*